Feb. 21, 1961  G. BIRKBECK ET AL  2,972,264
COUNTERBALANCING MEANS
Filed Nov. 20, 1957
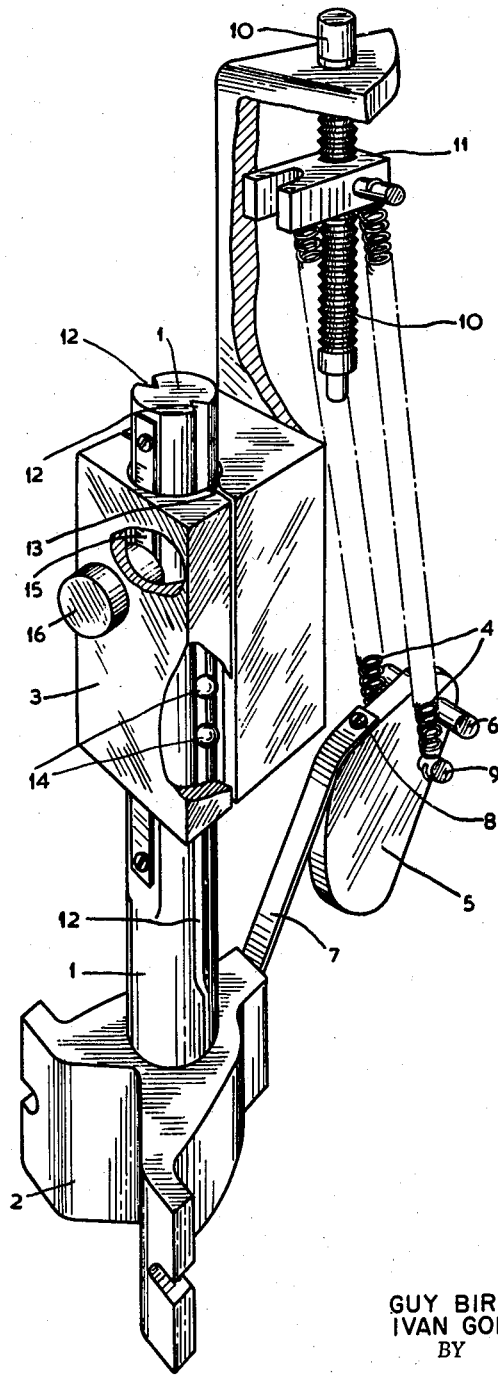
INVENTORS
GUY BIRKBECK
IVAN GODFREY OLIVER BROWN
BY
AGENT

United States Patent Office 2,972,264
Patented Feb. 21, 1961

2,972,264

COUNTERBALANCING MEANS

Guy Birkbeck, Reigate, and Ivan Godfrey Oliver Brown, Horley, England, assignors to North American Philips Company, Inc., New York, N.Y.

Filed Nov. 20, 1957, Ser. No. 697,708

Claims priority, application Great Britain Nov. 30, 1956

2 Claims. (Cl. 74—592)

This invention relates to means for sensing, regulating and maintaining tool pressures in ultrasonic work machines.

The term "ultrasonic work machines" means machines which rely on the vibration of a tool at ultrasonic frequencies usually applied with an abrasive slurry and which provide means for cutting, boring, and engraving hard and brittle substances such as glass and quartz. The vibrations are normally obtained from electrical energy and converted to mechanical vibrations by means of an electro-mechanical transducer. The frequency of such vibrations are usually at a fundamental frequency outside the normal human hearing range. For example with a small bench-type machine consuming 50 watts of electrical power at 20 kc./s. the mean force presented at the working face of the vibrating tool is relatively low and careful adjustment of the tool pressure against the workpiece is important particularly when applied to thin brittle substances the application of tool pressure being critical in that too much will damp the vibrations and too little will prevent the activation of the abrasive with the consequential slowing down of the machining process. It will therefore be understood that for successful machining with ultrasonic vibrations it is necessary to adjust and maintain throughout the machining operation a tool pressure which will give the most satisfactory working point between the two extremes. In practice with a machine of the type mentioned a satisfactory result is obtained with a tool having a pressure of 30 lbs. per sq. inch of tool area when machining plate glass.

Furthermore the successful machining of fragile materials and those demanding a high order of accuracy, for example the boring of small holes having a diameter of the order of 3 to 5 thousandths of an inch, is also largely dependent upon the smooth operation of the moving parts relative to the static guiding means. Such smoothness of operation has the added advantage of assisting the operator by the sense of "feel" to choose the optimum machining condition.

In the case of an ultrasonic machine having its tool vertically disposed so as to descend on the workpiece the pressure of the tool on the workpiece will, due to gravity, equal its own mass plus that of the associated vertically moving parts which may also include the transducer. This is provided that the vertically moving parts have little friction with that of the static guiding means. The tool pressure thus presented to the workpiece is far too great and it is usual to employ a counter-balancing force such as a spring or levered weight.

The use of simple counter-balancing means in ultrasonic machines suffers from the disadvantage that such expedients do not present a constant tool pressure at varying points of tool travel. A machine which having its vertical moving mass balanced against a spring will exhibit decreasing tool pressure as the tool progresses in a downward direction through the workpiece.

It is the object of this invention to provide an improved adjustable counter-balancing arrangement for ultrasonic machines.

According to the present invention an ultrasonic work machine comprises an electro-mechanical transducer-tool assembly mounted on the body of the machine for linear movement relative thereto over a predetermined range of travel under the action of its mass and adjustable counter-balancing means for said assembly so arranged as to provide a substantially constant and predetermined counter balance force on, and at all positions of, the assembly within said predetermined range of travel.

In order that this invention may be clearly understood reference is directed to the accompanying diagrammatic drawing which illustrates by way of example a particular embodiment of a counter-balancing means in accordance with the present invention in which 1 is a vertically sliding shaft the lower end of which has a bracket 2 adapted to receive an electro-mechanical transducer and associated machine tool, not shown. A housing 3 provides a static vertical guide means for the shaft 1 which is counter balanced against gravity by means of springs 4 which direct an upward rotating force on cam 5 about its pivot 6. A flexible metal strip 7 is anchored along the cam's profile at a point 8 so as to act as a follower, the other end of the strip 7 being fastened to the vertically sliding shaft through the bracket 2. The varying force applied to the cam through the leverage of spring anchor 9 and pivot 6 by the expansion and contraction of the springs 4 is rendered substantially constant over the range of travel of shaft 1 by virtue of its linkage to the compensating effect of the cam's profile.

Initial adjustment of the tool pressure is effected by expanding or contracting the spring 4 by rotating the screw 10 which drives the spring anchor block 11 up or down. The vertically sliding shaft 1 is indexed to the guide housing 3 by means of longitudinal channels 12 which together with complementary channels 13 in the guide form bearing surfaces for the ball bearings 14. The guide housing 3 is split in two halves along the apex of the channel 13 in order to permit the machining or insertion of shims to ensure, in association with the ball bearings 14, the low friction indexing of the shaft 1 relative to the guide housing 3. The shaft 1 is also provided with a longitudinal flat machined along its front face to which is fixed a scale 15 which together with a magnifying lens 16 provides an accurate means for measuring small vertical movements of the shaft 1 and the associated machine tool and can be used for repeating tool pressure conditions found suitable in performing any given task where conditions relate to the particular transducer and tool combination so as to produce the most efficient machining condition in each particular case and enabling the user to record each set-up.

An ultrasonic machine constructed on these principles will exhibit the desired characteristics of providing a substantially constant tool pressure over a suitable range of tool travel and also provide means of adjusting tool pressures which includes an accurate means of gauging the tools progressive operation relative to the workpiece.

What is claimed is:

1. An ultrasonic work machine of the class described comprising an electro-mechanical transducer tool assembly mounted on the body of said work machine for linear movement relative thereto over a predetermined range of travel under the action of its mass, adjustable counterbalancing means also co-acting with said assembly, said counterbalancing means including at least one longitudinal spring, a tension adjusting means, a cam, a pivot for said cam, means mounting said tension adjusting means on the body of the work machine, one end of said spring being secured to said tension adjusting means, the other end of said spring being fixed to said cam at a point spaced from said pivot, said spring constantly applying a rotational force to said cam, a flexible strip secured at one end to the operational face of said cam and at the other end thereof engaging a portion of said assembly, the profile of the operational face of said cam imposing a substantially constant counter balancing force to the assembly over its range of travel, a guide housing, a vertically disposed shaft movable in said guide housing, said shaft and said housing being provided with at least two corresponding indexing channels, and a plurality of ball bearing in said channels providing bearing surfaces.

2. An ultrasonic work machine of the class described comprising an electro-mechanical transducer tool assembly mounted on the body of said work machine for linear movement relative thereto over a predetermined range of travel under the action of its mass, adjustable counterbalancing means also co-acting with said assembly, said counterbalancing means including at least one longitudinal spring, a tension adjusting screw, a cam, a pivot for said cam, means mounting said tension adjusting screw on the body of the work machine, one end of said spring being secured to said tension adjusting screw, the other end of said spring being fixed to said cam at a point spaced from said pivot, said spring constantly applying a rotational force to said cam, a flexible strip secured at one end to the operational face of said cam and at the other end thereof engaging a portion of said assembly, the profile of the operational face of said cam imposing a substantially constant counter balancing force to the assembly over its range of travel, a guide housing, a vertically disposed shaft movable in said guide housing, said shaft being provided with a flat strip extending longitudinally of said shaft and provided with a reference scale, said shaft and said housing having at least two corresponding indexing channels, and a plurality of ball bearings in said channels providing bearing surfaces.

References Cited in the file of this patent

UNITED STATES PATENTS

| | | |
|---|---|---|
| 1,584,931 | Handy et al. | May 18, 1926 |
| 2,178,122 | Ostler | Oct. 31, 1939 |
| 2,274,601 | Hartgering et al. | Feb. 24, 1942 |
| 2,584,921 | Rawasley | Feb. 5, 1952 |
| 2,706,913 | Trossi | Apr. 26, 1955 |

FOREIGN PATENTS

| | | |
|---|---|---|
| 831,809 | France | June 13, 1938 |